United States Patent [19]

Miller et al.

[11] Patent Number: 5,420,607
[45] Date of Patent: May 30, 1995

[54] ELECTRONIC PAINTBRUSH AND COLOR PALETTE

[76] Inventors: Robert F. Miller, 3925 Mesrob Ct., Modesto, Calif. 95356; Steven M. Blonstein, 941 Newell Rd., Palo Alto, Calif. 94303

[21] Appl. No.: 224,088

[22] Filed: Apr. 6, 1994

Related U.S. Application Data

[63] Continuation of Ser. No. 939,109, Sep. 2, 1992, abandoned.

[51] Int. Cl.⁶ ............................................. G09G 3/02
[52] U.S. Cl. ..................................... 345/156; 345/179
[58] Field of Search ............... 345/156, 173, 179, 180, 345/87, 88, 150, 151, 158; 178/18, 19

[56] References Cited

U.S. PATENT DOCUMENTS

| | | | |
|---|---|---|---|
| 4,524,421 | 6/1985 | Searby et al. | 340/706 |
| 4,565,999 | 1/1986 | King et al. | 340/707 |
| 4,577,057 | 3/1986 | Blesser | 178/19 |
| 4,642,459 | 2/1987 | Caswell et al. | 340/707 |
| 4,922,236 | 5/1990 | Heady | 340/706 |

FOREIGN PATENT DOCUMENTS

0414566 2/1991 European Pat. Off.

OTHER PUBLICATIONS

"Using MacWrite and MacPaint" 1984 pp. 67–79.

*Primary Examiner*—Ulysses Weldon
*Assistant Examiner*—Doon Chow
*Attorney, Agent, or Firm*—Heller, Ehrman, White & McAuliffe

[57] ABSTRACT

An electronic paintbrush and electronic palette which allow a user to generate images on a CRT screen in a manner which imitates traditional painting with paints on a canvas. The electronic brush has fiber optic bristles which channel light from a CRT screen to optical detectors. A microprocessor in the brush utilizes pulses generated by the incidence of the raster scan on photodiodes to determine the position of the brush, the pressure of the brush against the CRT screen, and its angular orientation about the longitudinal axis of the brush. The microprocessor utilizes color information generated by a CCD array to determine the area of contact of the brush with color swatches on the palette, and the angle between the longitudinal axis of the brush and the normal vector to the CRT screen. In an alternate embodiment the palette is also displayed on the CRT screen.

41 Claims, 8 Drawing Sheets

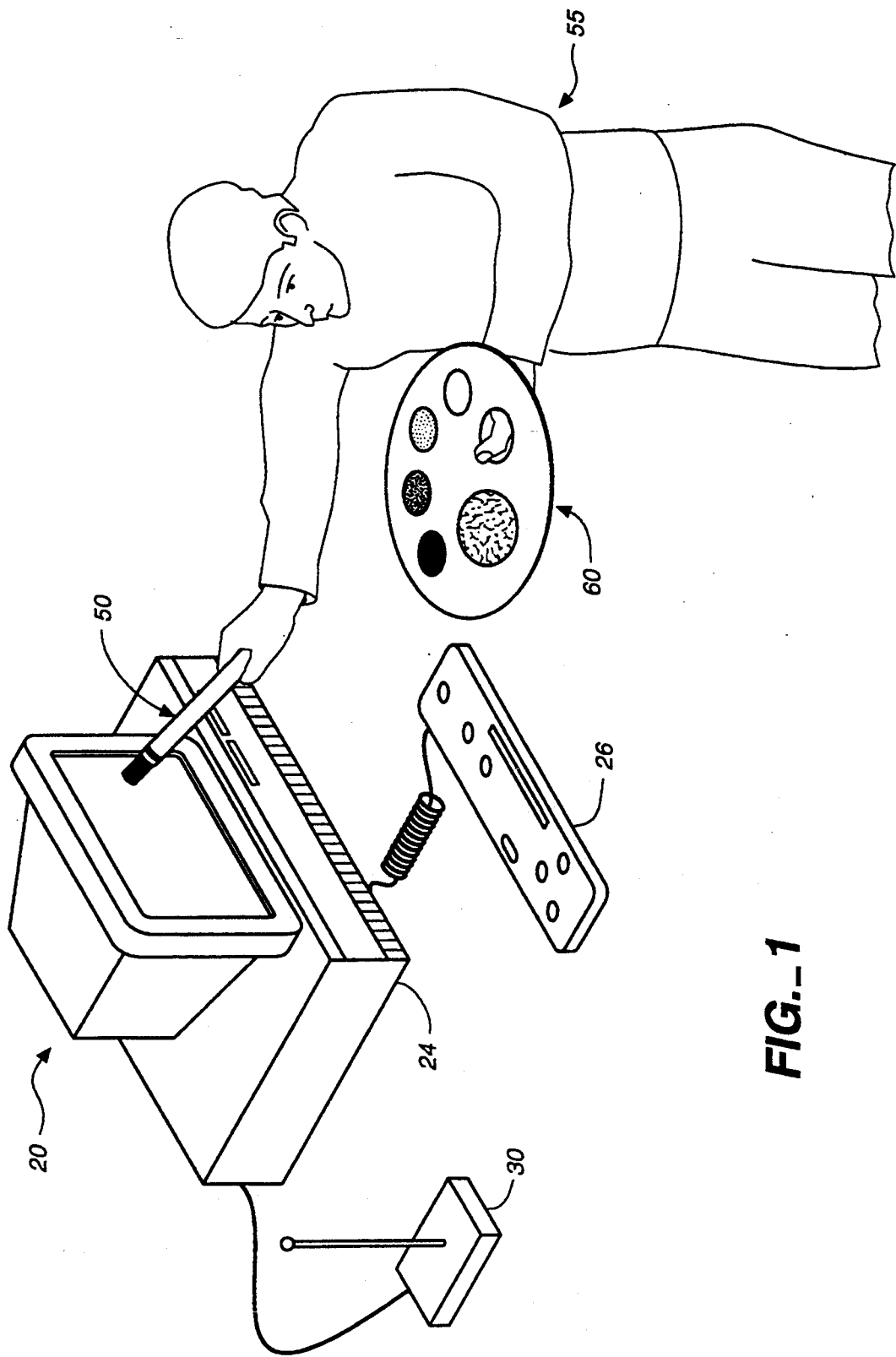
FIG._1

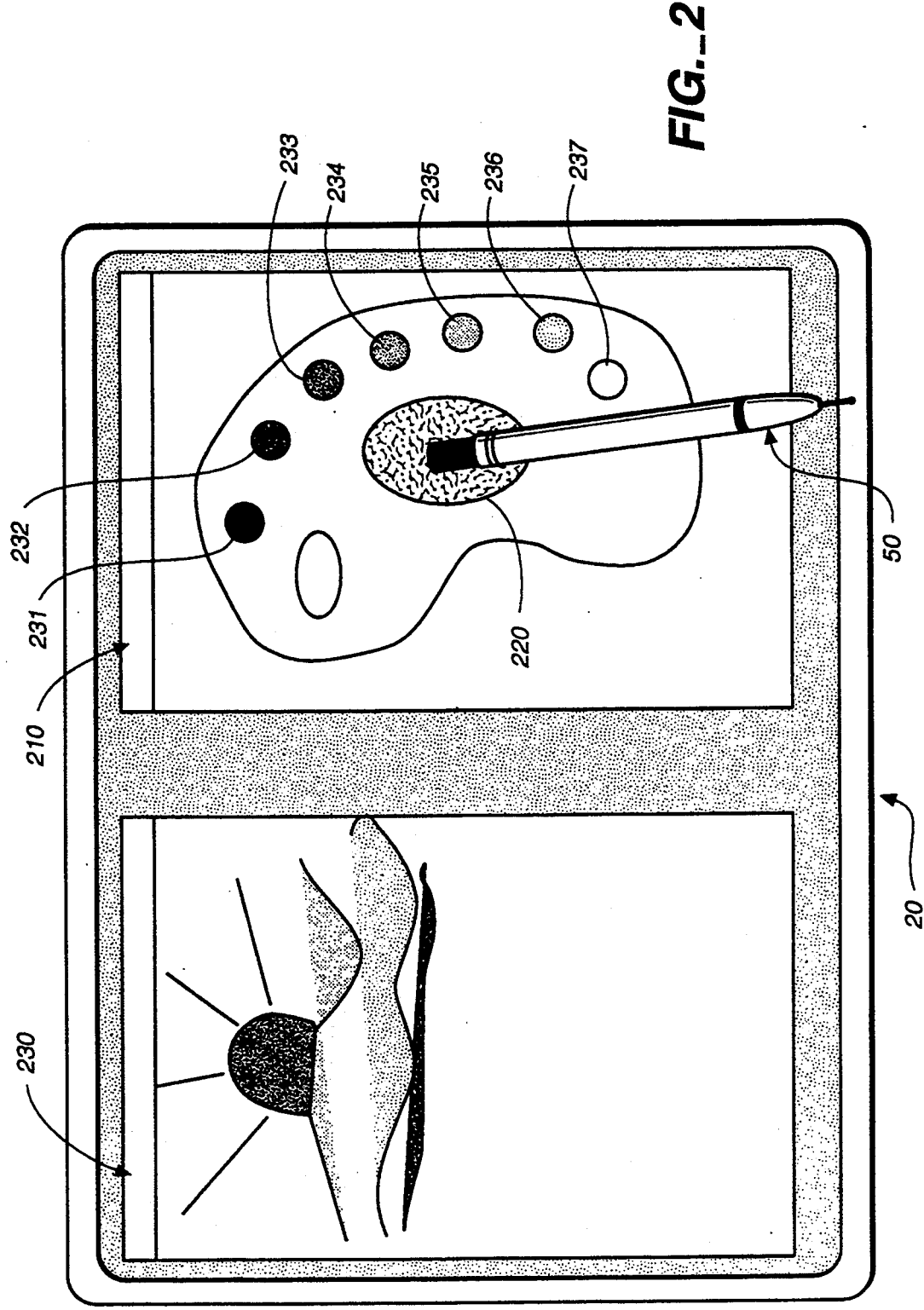

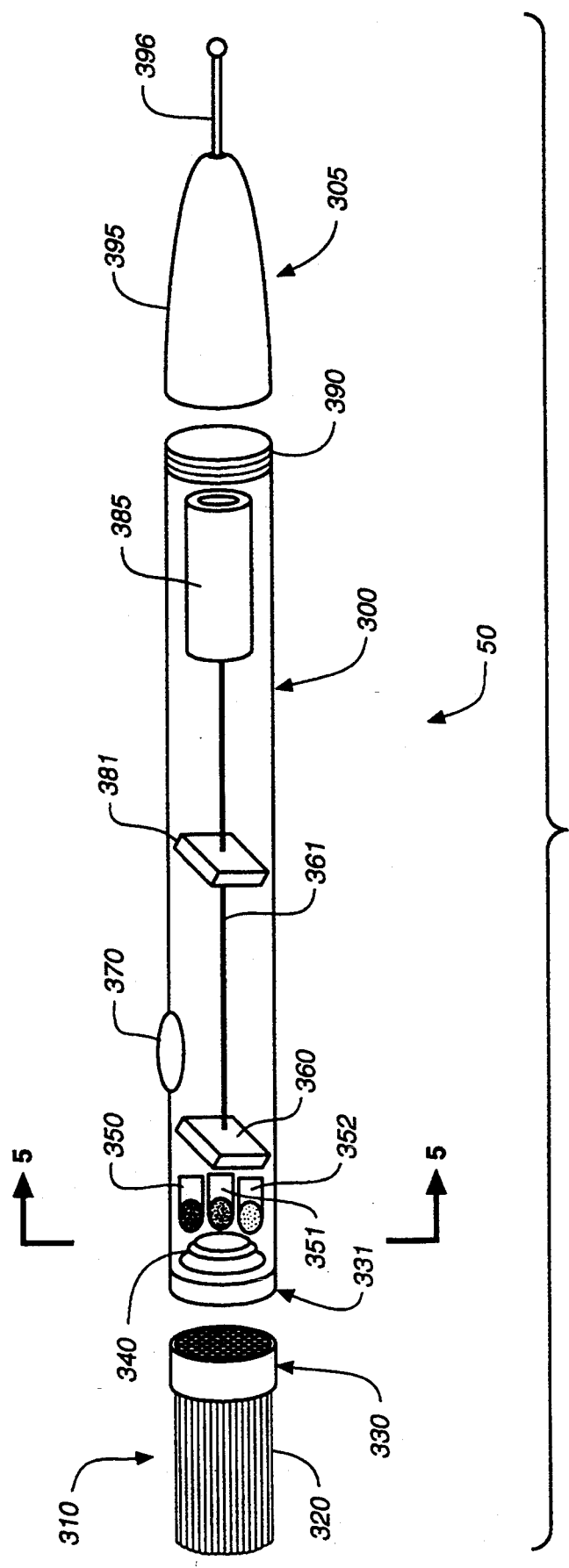
FIG._3

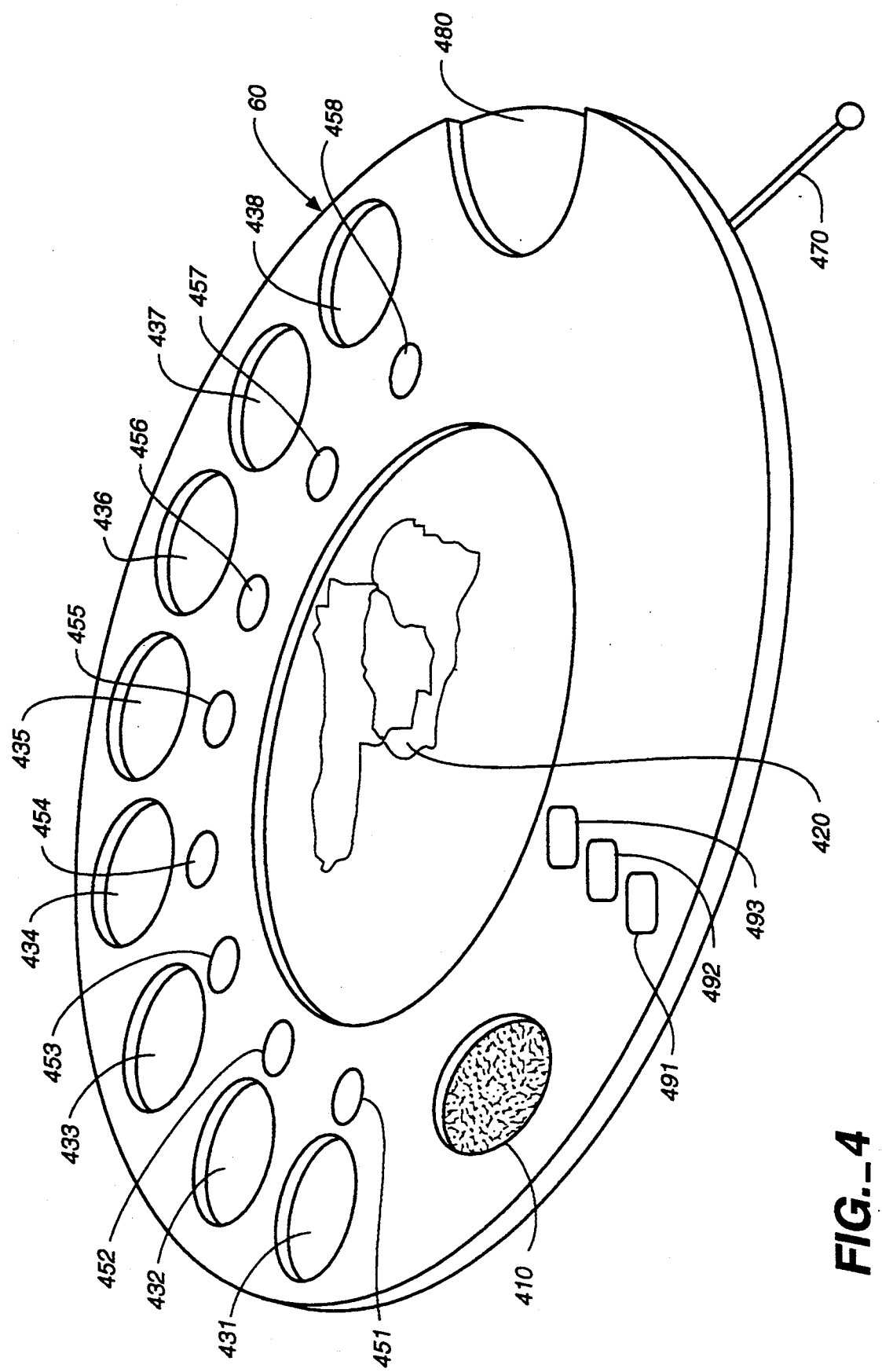
FIG._4

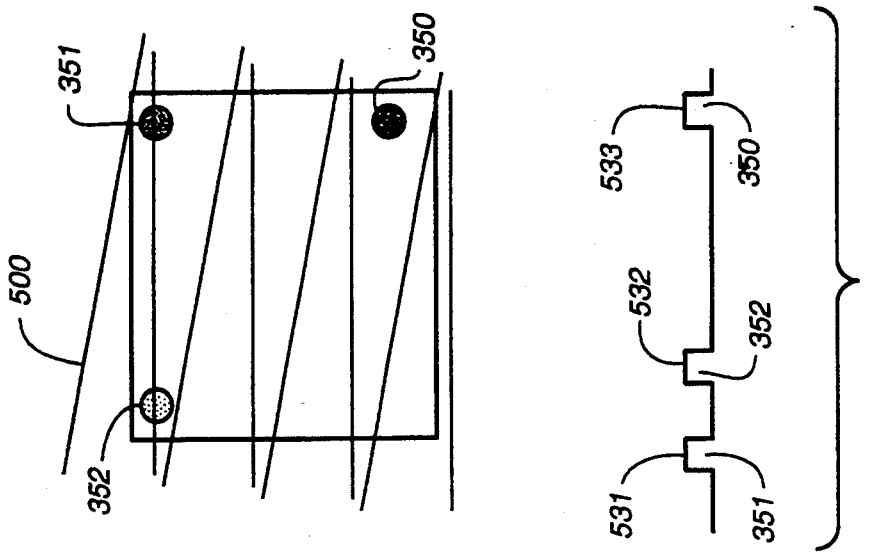
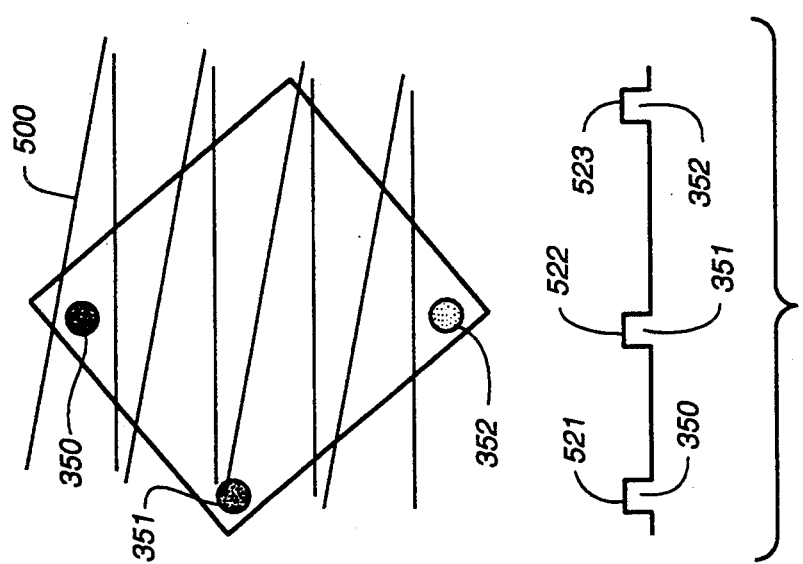
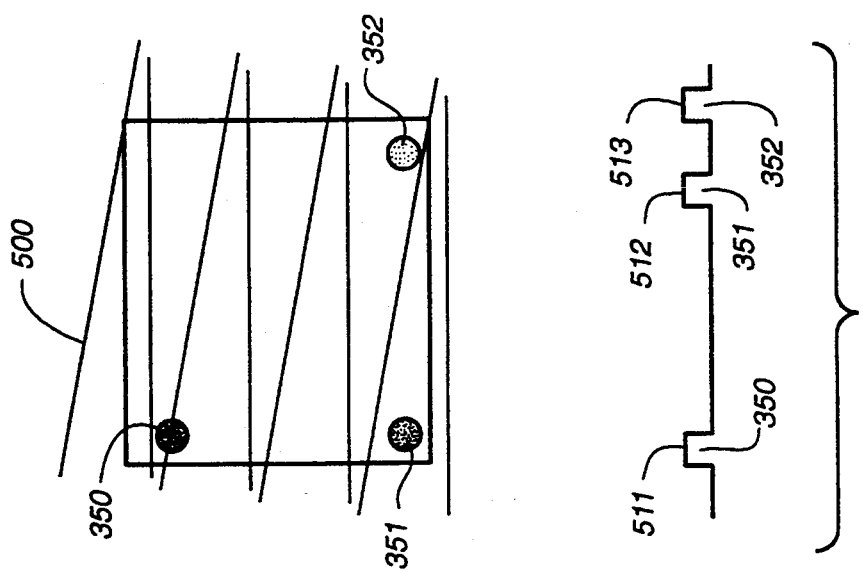

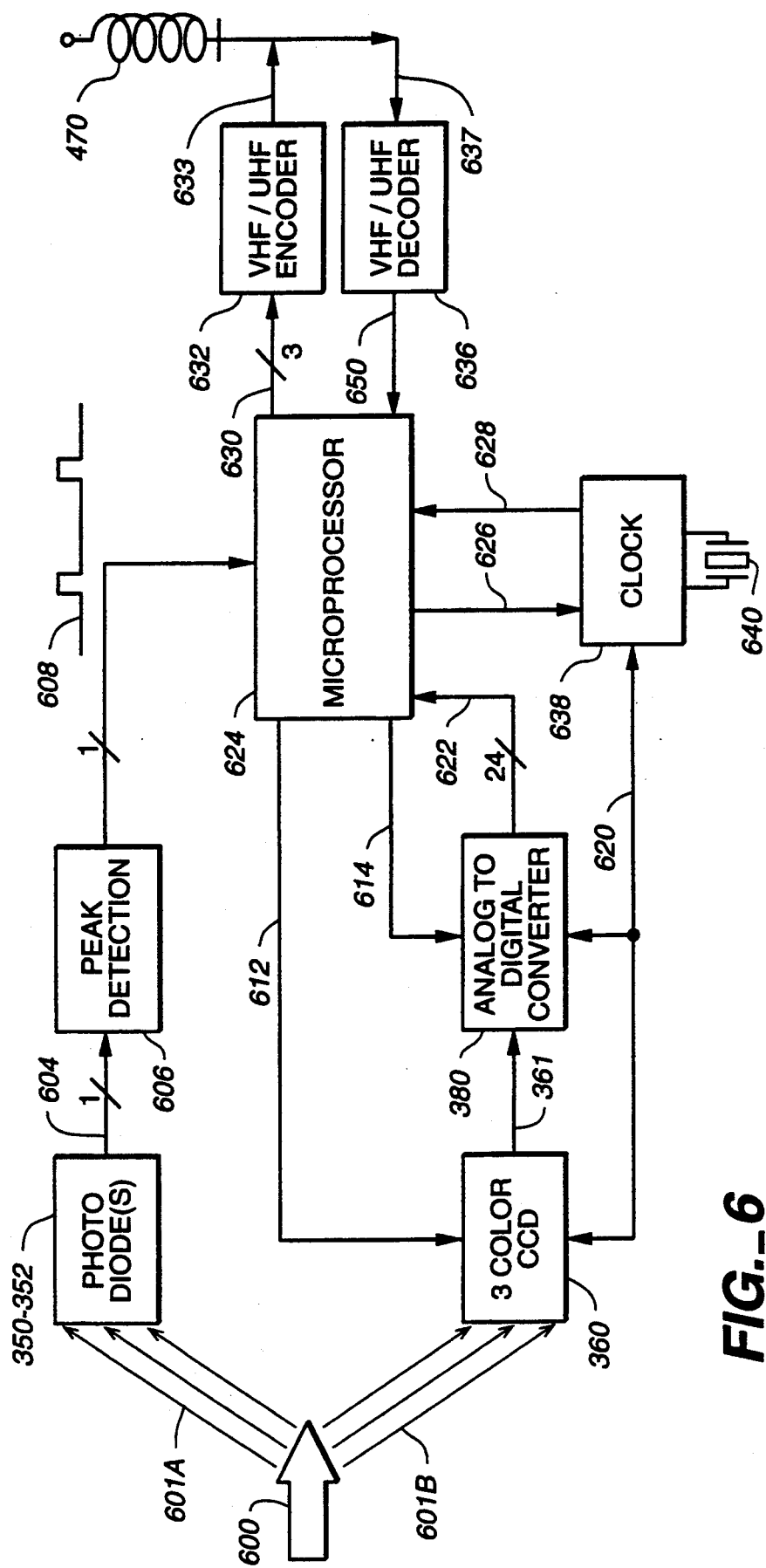
FIG._6

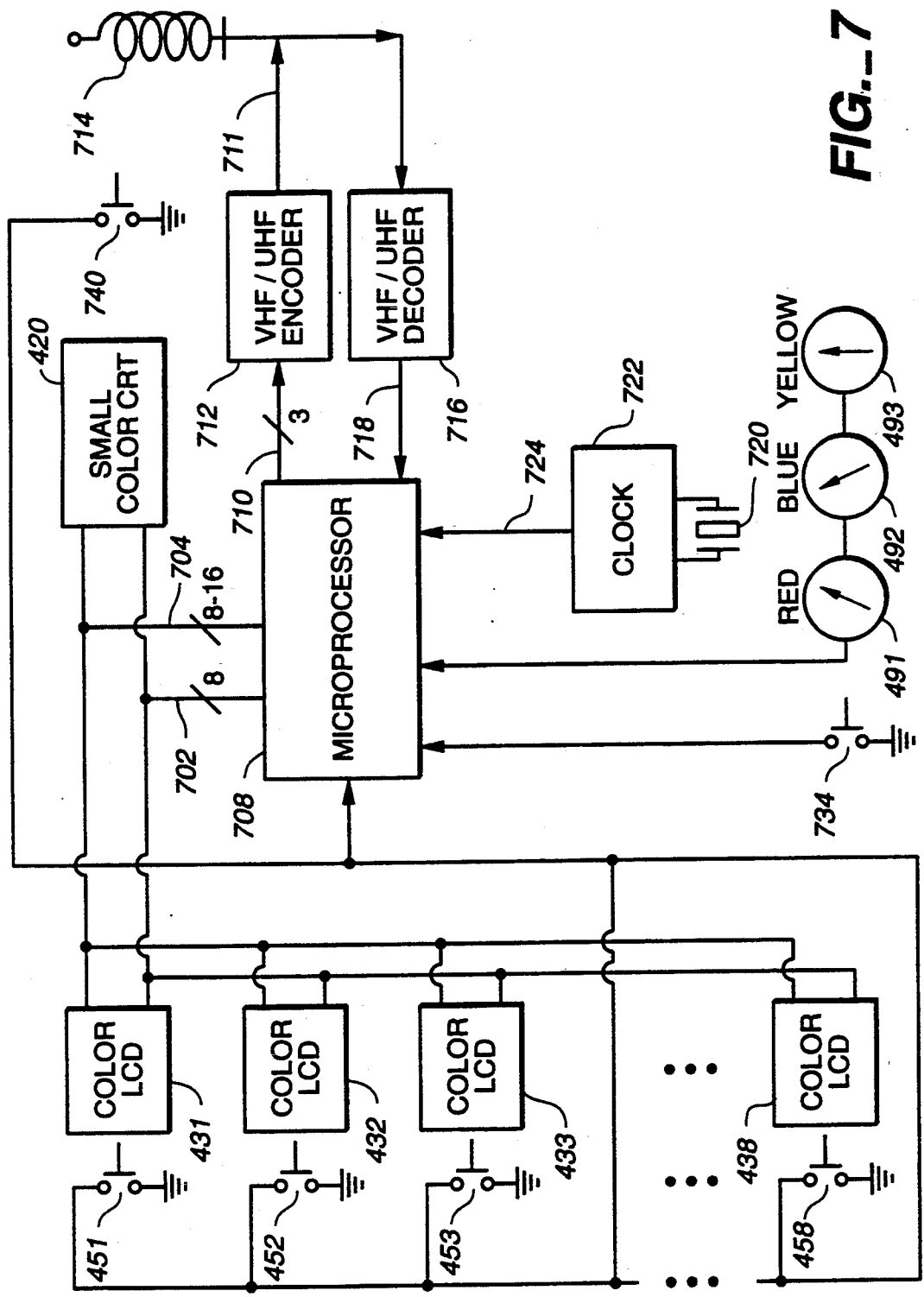
FIG._7

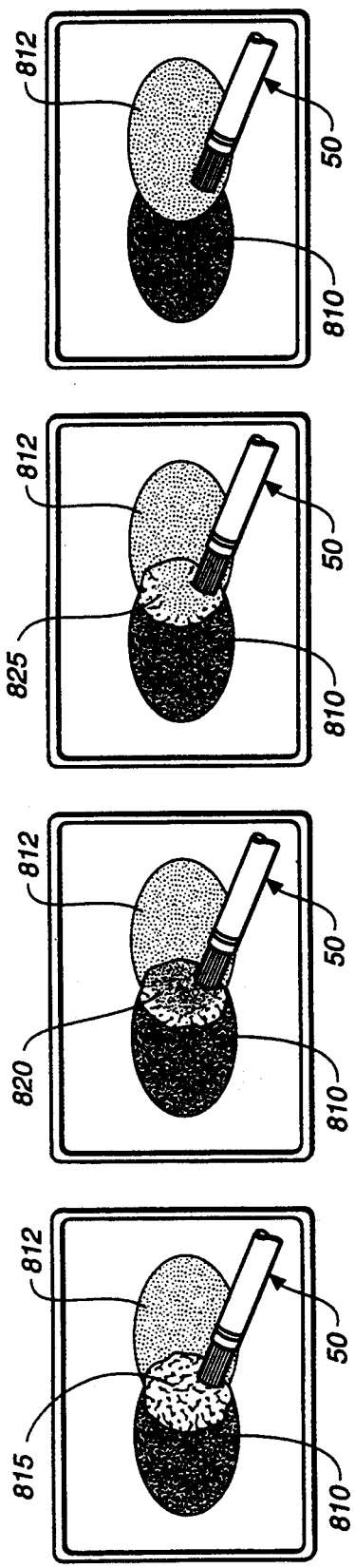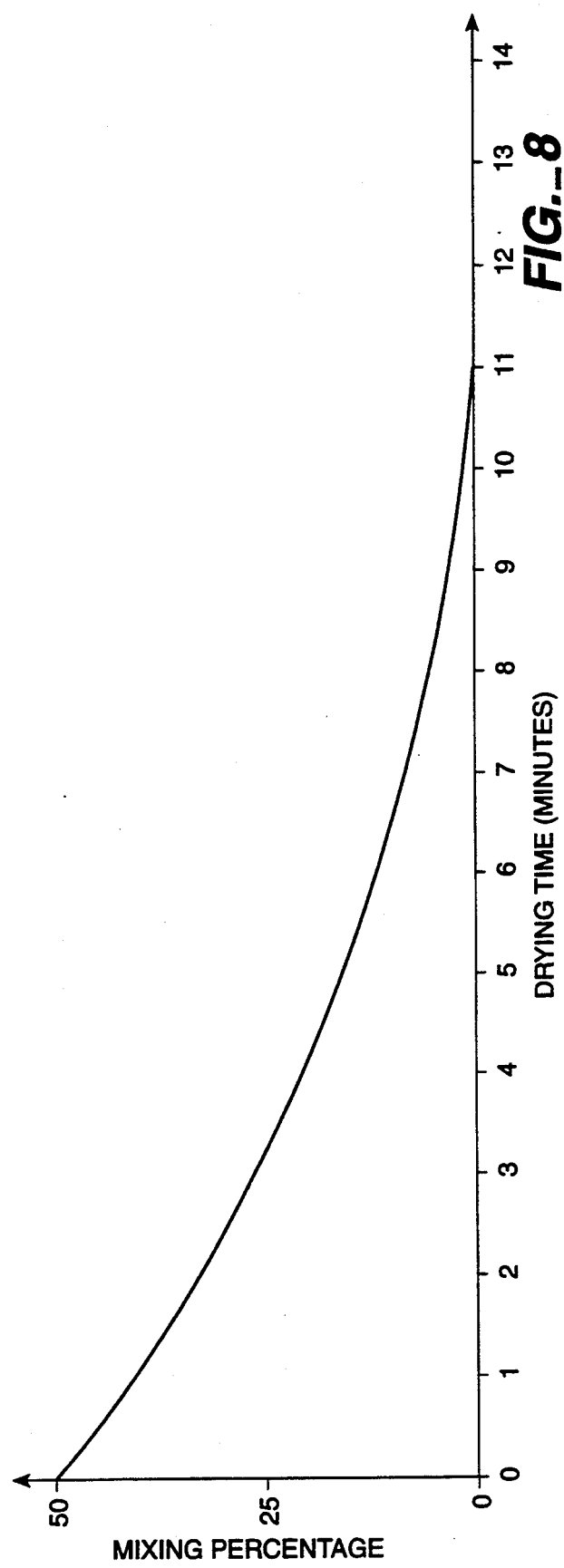
FIG._8A FIG._8B FIG._8C FIG._8D
FIG._8

ELECTRONIC PAINTBRUSH AND COLOR PALETTE

This is a continuation of application Ser. No. 07/939,109, filed Sep. 2, 1992, now abandoned.

BACKGROUND OF THE INVENTION

The present invention relates to an apparatus for altering a display on an electronic display screen, and in particular to such apparatus that mimic nonelectronic apparatus. In particular, the present invention relates to apparatus for altering the display on an electronic display screen which mimics the characteristics of a paintbrush and paint palette.

The advent of the modern (lay computing machines has led to a proliferation of software programs that allow drafters, graphic designers, photo touch-up experts, and artists to practice their skills using a computer instead of traditional methods that are generally slower, less reproducible, and more expensive.

Machines such as the Xerox Star and Apple Macintosh introduced the concept of icon and mouse based computing to the general population. The main purpose of the icon and mouse was to eliminate the need to remember long complex instruction sequences that could be simply replaced by a point and click action of the mouse over an icon or menu selection. This methodology became prevalent in the middle to late 1980's and will probably remain so.

The light pen allows a user to input data to a computer by touching the pen directly to the display screen. The primary purpose of the light pen is the selection of menu items on the screen. In recent years, the light pen has also found application as an input device that simulates a drawing tool such as a pencil. The connection to the host computer is usually through a cable to a serial or parallel I/O port from the pen.

Typical processes required in a mouse-based drawing/painting program include a pencil-like tool, a fill-in tool, an eraser, a paintbrush, a spray can, a pencil, smudging tools, and sharpening tools. The program may also allow the user to select the shape and size of paintbrush represented by the mouse.

The mouse-based paintbrush suffers from a number of inherent drawbacks. First, there is poor feedback between the motions of the mouse and the actions on the screen, so that painting requires unnatural hand-eye coordination. Second, the mouse cannot provide pressure sensitive action, i.e. the artist does not have the luxury of being able to press lightly to create thin wispy strokes, or press firmly to create broad harsh strokes. Third, the mouse does not provide the ability to mix colors in any way analogous to a paintbrush. Although most software paint programs have a color picker, the picker generally only allows the user to select a single color from a group of colors displayed on the CRT. Fourth, mouse-based paintbrushes only have the capability of selecting a single color. A real paintbrush can hold a mix of colors, and the corresponding brush strokes may have a striking effect. Fifth, the long mouse movements generally translate to shorter on-screen movements. Thus a long paintbrush stroke must be achieved by several movements of the mouse.

SUMMARY OF THE INVENTION

It is an object of the present invention to provide an apparatus that will overcome the above-mentioned limitations of the prior art and allow an artist or photo touch-up expert a far more realistic environment for painting using modern computer technology.

In one preferred embodiment, the electronic paintbrush of the present invention is comprised of a handle, a brush head of optic fibers, and means for transforming light channeled through the fibers into electrical signals. The electrical signals are processed to monitor the position of the brush, the orientation of the brush, and the pressure applied to the brush on the electronic display screen and palette.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 shows a user painting on a CRT screen using the electronic paintbrush and palette of the present invention.

FIG. 2 shows an alternate low-cost environment having a CRT screen with a painted image in one window and a palette in another window.

FIG. 3 is a schematic of the components of the paintbrush of the present invention.

FIG. 4 is a perspective view of the electronic palette of the present invention.

FIGS. 5-1, 5-2 and 5-3 show the path of the raster scan across three photodiodes for three orientations of the brush, and the corresponding electrical signals generated by the brush circuitry.

FIG. 6 is a block diagram of the circuitry of the paintbrush.

FIG. 7 is a block diagram of the circuitry of the palette.

FIGS. 8(a)–(d) show mixing of two color patches when the paint of one patch is in several stages of dryness ranging from completely wet to completely dry. FIG. 8(d) is a graph of the mixing percentage versus time for a paint with a drying time of 11 minutes.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The electronic paintbrush of the present invention is a device that is designed to have the feel of a traditional paintbrush like those currently sold in art stores. Unlike a traditional paintbrush, the "paint" on the electronic paintbrush does not necessarily run out. User controlled software defines the longevity of the drying time of the paint.

As shown in FIG. 1, an artist 55 paints on a CRT screen 20 with an electric paintbrush 50 and electronic hand-held palette 60 in much the same way that a traditional paintbrush and palette are used for painting on canvas. The image on the CRT 20 may also be manipulated by user input through the keyboard 26 by way of the processor 24. The image on the CRT 20 may be either a color image or a greyscale image. For convenience, in the description of the invention and the appended claims of the present application the word "color" will include shades of grey as well as all the colors of the rainbow.

Referring now to FIG. 4, the electronic hand-held palette 60 has a thumb hole 410 and can therefore be held like a traditional palette. A number of color swatches 431-438 display colors which can be picked up by the brush 50 and transferred to the mixing area 420 for color mixing. The color swatches 431-438 may, for instance, display black and white, and the primary and secondary colors red, orange, yellow, green, blue and purple. Blended colors appear in the mixing area 420 where it is touched by the fibers 320 of the brush head 310. The specific colors mixed depends on the colors chosen from the color swatches 431-438. For instance, if blue and orange are transferred from the color swatches 431-438 to the mixing area 420 and blended together by swirling motions of the brush 50, the resulting color appearing in the mixing area 420 is brown. The resulting color swatch in the mixing area 420 is not a single swatch of a pure color, but rather has streaks of a variety of shades of color just as real liquid paint might have. The artist 55 may then use the electronic brush 50 to transfer the mixed colors from the mixing area 420 or a pure color from a color swatch 431-438 to the CRT screen 20.

Control of the drying time is achieved by sampling an internal clock and for each particular pixel storing the initial sampling time at which an initial color is applied. When that pixel is revisited with the brush a comparison is done between the current clock time and the time when the initial color was applied. As the difference in time approaches a user selected drying time for that color, less of the original color is blended into the current brush colors, and more of the original color is replaced with the brush colors. If the drying time has expired the initial color is completely replaced with the currently selected brush color. This effect creates the illusion of paint drying on a canvas. The actual selection of a drying time for a particular color is accomplished via software control. The drying time may range from instantaneously quick to infinitely slow.

FIGS. 8(a)–(d) show mixing of the colors in a first color patch 810 and a second color patch 812 at several stages of dryness of the first patch 810. In FIG. 8(a) the paint of the first patch 810 was recently applied and is almost completely wet. The paint of the second patch 812 mixes completely with the paint of the first patch 810 to produce a mixed paint patch 815 of intermediate color where the first and second patches 810 and 812 overlap. In FIGS. 8(b) and 8(c) the paint of the first patch 810 was applied several minutes ago and is somewhat dry. In these figures the paint of the second patch 812 mixes partially with the paint of the first patch 810 to produce mixed paint regions 820 and 825 which have colors intermediate between the color of the first and second patches 810 and 812 but closer to that of the second patch 812 than the first patch 810. In FIG. 8(d) the paint of the first patch 810 is completely dry and where the second patch 812 overlaps with the first patch 810 the color is that of the fresh paint of the second patch 812. FIG. 8(e) is a plot of the mixing percentage versus time for a paint which dries in 11 minutes. The mixing percentage is defined as the color contribution from a first older patch 810 to the resulting color when a second patch 812 of paint is applied to a region which overlaps with the first patch 810. If the first patch 810 has been applied very recently, the color contribution from the paint of the first patch 810 is approximately 50%, whereas none of the paint of the first patch 810 contributes to the color of the overlap region when the paint of the first patch 810 has been on the screen for a time greater than the drying time.

Referring again to FIG. 1, the electronic brush 50 interacts with both the computer 24 and palette 60 via radio frequency transmissions. An antenna 30 receives wireless signals from the brush 50 and relays these signals to the host processor 24. Alternatively, communication may be via standard serial or parallel cables, or via a wireless connection by infrared or ultrasound transmissions.

Referring now to FIG. 3, the electronic paintbrush 50 has a length of approximately six to twelve inches and a diameter of approximately 0.25 to 0.50 inches. The paintbrush 50 is comprised of a brush head section 310, a handle section 300, and a transmitter section 305. The handle 300 is designed to be comfortable and utilitarian, and contains a portion of the electronic circuitry required to control the interaction between the artist 55 and the host computer 24.

Unlike a traditional paintbrush, the head section 310 of the electronic paintbrush 50 is removably attached to the handle section 300 by a press fit mechanism 330 and 331. The paintbrush 50 of the present invention is equipped with several different brush heads (not shown) that may be removably mounted on the handle 300. By any one of a number of means known in the art, the type of brush head is determinable by the processing chip 381, and this information is relayed, along with the optic information, to the host processor 24.

The brush head 310 consists of a large number, typically hundreds or thousands, of optic fibers 320. The fibers 320 typically have a diameter of about two thousandths of an inch.

In a preferred embodiment, the fibers 320 are of equal length and packed to form a perfect circle of about 0.1 inches. Assuming that the optical fibers are 0.002" in diameter, the approximate number of fibers packed into the brush head 310 will be about 2500. The fibers have a length of approximately 0.5 inches. The fiber optical material may be glass or plastic.

Optical fibers carry light through the fiber with little loss over a short distances. Traditionally, a laser or LED is modulated to transmit digital information through a fiber optic strand which functions as a light pipe to a receiving location that can be miles from the source. In the present invention the optical fibers are very short, and the transmitting source of light is the CRT screen 20 or the palette 60.

Light from the host computer CRT screen 20 passes through the fibers 320 as the artist 55 applies the brush 50 to the surface of the screen 20. The incoming light is focused by a lens system 340 onto three photodiodes 350, 3.51 and 352, and a charge coupled device (CCD) 360. The CCD 360 has a rectangular shape and the three photodiodes 350, 351, 352 are located at corners of the CCD 360. On a periodic basis, the CCD 360 transfers the captured light signal by way of wires 361 to a processing chip 381. The limiting factor for the shortest sampling time is the ability of the CCD 360 to gather enough light information within the sampling time to provide a reliable signal. The sampling rate must be fast enough to accurately trace the path of the brush 50 if it is being moved quickly.

The processing chip 381 in the handle of the brush 50 provides the preprocessing necessary to interpret the raw data from the CCD 360 and photodiodes 350-352 so that only basic information is communicated to the host. The raw digital data from the processing chip 381 is sent to the host computer 24 via a miniature transmitter (not shown in FIG. 3) which includes a small antenna 396 on a cap 395 located at the tip of the handle 300. The cap 395 has screw threads (not shown for clarity purposes) and the handle 300 has opposing screw threads 390 to allow the cap 395 to be removably attached to the handle 300.

Power for the circuit elements of the handle 300 is provided by a standard battery 385 that may be loaded into the end of the handle section 300 when the cap 395 is removed. Nickel cadmium batteries can generally run for 1 to 2 hours. The battery 385 is accessible to allow easy substitution of the charged batteries for uncharged ones so that work can continue without interruption.

To determine the location of the brush 50 on the CRT screen 20, light which passes through the fibers 320 is focused onto the plane of the CCD sensor 360 and the three photodiodes 350, 351, and 352. As is known to those skilled in the art, the position of the brush 50 on a raster scanned screen can be determined using only a single photodiode. Since the location of the raster scan on the CRT screen 20 is known at any instant, the location of the brush can be determined if the time at which the brush receives a sharp brightness pulse is noted.

FIGS. 5-1, 5-2 and 5-3 are schematic views along the longitudinal axis of the brush 50 of the locations of the photodiodes 350-352 and the raster scan path 500 as projected across the plane of the photodiodes 350-352. The photodiodes have an asymmetrical triangular arrangement. Each photodiode 350-352 produces a pulse when the raster beam 500 passes the portion of the CRT 20 that is focused onto that particular photodiode 350-352. If the brush is held with the orientation shown in FIG. 5-1, photodiode 350 is the first to sense the raster beam 500 and produce a pulse 511. Several raster lines later two pulses 512 and 513 generated by photodiodes 351 and 352 occur closely spaced in time.

In FIG. 5-2 the brush 50 is rotated clockwise by approximately 45 degrees. Because the positions of the photodiodes 350, 351, and 352 has changed, the relationship between the pulses from the three diodes 350, 351 and 352 will also change. Diode 350 still produces a first pulse 521, but pulses 522 and 523 from diodes 351 and 352 will be separated by a greater amount of time than in the previous example. The pulse=timing enables the processor to determine the brush rotation at approximately 45 degrees by techniques known to those skilled in the art. One such technique might be to use a memory look-up table which is indexed by the time differences between the diode pulses.

In FIG. 5-3 the brush 50 is rotated by 180 degrees relative to the orientation of FIG. 5-1. In this case the initial pulse 531 is generated by photodiode 351. The initial pulse 531 is followed closely by a pulse 532 generated by photodiode 352. Several raster scan lines later a pulse 533 from photodiode 350 follows. Again, the pulse timing enables the=processor to determine the brush rotation by techniques known to those skilled in the art.

The pulse timing may also be used to determine the pressure with which the optic fibers 320 are pressed against the surface of the CRT screen 20. In the above description associated with FIGS. 5-1, 5-2 and 5-3 it was assumed that the brush 50 is pressing lightly and uniformly on the surface of the CRT screen 20. As greater pressure is applied to the surface of the CRT 20, the fibers 320 will spread out in a radial fashion causing a circle of contact with a larger diameter. The result of this is that the time period between the first and last of the three pulses from the three photodiodes 350, 351 and 352 increases because it takes a longer time for a single raster line to horizontally traverse the area of contact; more CRT raster lines are needed to vertically traverse the area of contact. The host processor 24 uses this information to determine the site of the area of contact using means known to those skilled in the art. One such technique might be to use a memory look-up table which is indexed by the time differences between the diode pulses.

The brush 50 of the present invention is also capable of detecting the color of the surface with which the optic fibers 320 are in contact by processing the signal from the CCD 360. In the preferred embodiment, the CCD 360 has built-in color filtering so that the levels of the primary colors can be determined directly from the output of the CCD 360. In general, the array CCD 360 array has $n \times m$ elements where n and m are arbitrary integers. In the preferred embodiment the CCD 360 has a resolution of 30 by 30 pixels.

Note that there is not necessarily any correlation between the CRT pixel resolution, brush head size, and dimensions of internal CCD array with respect to each device's resolution. Since the horizontal and vertical resolution of the CCD 360 array is a fixed value which does not necessarily correspond to that of the CRT 20 or the hand-held palette 60, the software controlling the interaction between the brush 50 and the host processor 24 must map the array resolution to the CRT's 360 screen resolution.

In the system of the present invention, the artist 55 is provided with means for selecting a drying time for the paint on the screen 20. The drying time can be almost immediate or can be infinitely long.

In a traditional painting environment differences in pressure result in a different rate of paint transfer from the brush to the canvas, i.e. different types of brush strokes. The electronic paintbrush 50 of the present invention can mimic this property of a traditional brush. The information from the two dimensional CCD array 360 allows the processor 24 to monitor how the brush 50 is being applied to the screen 20. By pushing the brush 50 against the screen 20, the fibers 320 tend to bend in one direction or another. With the fibers 320 gently touching the screen 20 and the longitudinal axis of the brush 50 oriented perpendicular to the screen, the fibers are also oriented perpendicular to the screen 20, the light travels up the fibers 320 to the detection devices. However, as one increases the angle between the longitudinal axis of the brush 50 and the normal vector of the screen 20 (the tilt angle), or applies pressure to the screen 30 with the brush 50, the projection of the cross-sectional area of some of the fibers 320 decreases, and therefore the light arriving at portions of the CCD array 360 also decreases. By comparing the light incident on the CCD 360 and the actual image displayed on the =screen 20 by the host computer 24, the degree of pressure and/or the tilt angle may be determined by techniques known to those skilled in the art.

The electronic palette 60 allows for the selection of colors with which the artist 55 will perform mixing. A number of color swatches 431–438 are available on the palette 60. The hand-held palette 60 has a removable cover 480 which houses a battery compartment. The cover 480 snaps into place or is held by a screw. In the hand-held palette 60 the colors of the color swatches 431–438 are generated by color liquid crystal displays (LCDs), and the colors in the mixing area 420 are generated by a color CRT. There is a local processor (not shown in FIG. 4) in the hand-held palette 60, as in the brush handle 300, to control local events with limited feedback to the host processor 24, and send information via antennae 396 to the brush 50 or host computer 24.

By depressing a button 370 on the handle 300 of the brush 50 the artist 55 instructs the brush 50 to pick color up from the palette 60. When the button 396 is not depressed the artist 55 may lay color down on the image screen 230 or in the palette mixing area 420. When the fibers 320 are in contact with the color swatches 431–438 the circuitry of the brush 50 (discussed below) reads the color from the palette 60 and transmits the information back to the host computer 24. On applying a second color to the mixing area 420, the colors may be mixed just as would occur on a traditional palette.

The electronic hand-held palette 60 provides some extra features unavailable in a conventional palette. The color of any swatch 431–438 may be adjusted by pressing an input button 451–458 next to the color swatch 431–438, adjusting the three color potentiometers 491, 492 and 493 until the color is as desired, and then pressing the input button 451–458 a second time. The three potentiometers 491, 492, and 493 control the amount of red, blue and yellow, respectively, in the swatch 431–438. The amount of movement of the red potentiometer 491 controls the change in the amount of red in the swatch 431–438, and similarly for the blue and yellow potentiometers 492 and 493.

By double pressing an input button 451–458 the present color of the corresponding swatch 431–438 is cleared, and the color displayed by the swatch 431–438 corresponds to the setting of the three color potentiometers 491–493. (A double press is defined as a pair of depressions of the same button occurring within a predefined short time period.) In this mode the settings of the potentiometers correspond to the actual (absolute) color of the swatch 431–438, rather than the change in color as in the previously described mode. Once the desired color is set it is stored by a single depression of the input button 451–458 adjacent the swatch 431–438.

As the electronic paintbrush 50 approaches an LCD color swatch 431–438, the CCD 360 starts to pick up the colored light emitted by the swatch 431–438. The microprocessor 381 in the brush 50 interprets this color and determines which color swatch 431–438 the brush is on by comparing the incoming color data and the preprogrammed swatch color values. The amount of paint picked up by the brush fibers 320 is determined by the length of time the brush 50 is left on the color swatch 431–438 and by the tilt angle of the brush 50 to the swatch. 431–438. The artist 55 may now either transfer the paint to the image, or mix the paint on the palette 60.

Mixing of paint is under the control of a palette microprocessor. Factors that affect the mixing include the brush movement on the surface of the CRT 420. The system of the present invention simulates liquid paint mixing as closely as possible. However, the option exists to carry the process one step further: the artist 55 may choose to have an infinite drying time for the paint. This is very useful if the artist 55 decides to stop work for an extended period of time.

As shown in FIG. 6, light 600 from the optical fibers 320 is split into two beams 601a and 601b by standard optical components. The process by which a beam is split is known to those skilled in the art. One beam 601a is directed to the three photodiodes 350–352. The photodiodes 350–352 are very sensitive silicon based optical detectors. They are used to detect the electron-beam raster scan on the surface of the CRT 24. The photodiodes 350–352 convert light to an analog electrical signal 604. The magnitude of the signal 604 is related to the intensity of the light 601a. A peak detection circuit 606, using filtering and peak detection techniques known in the art, isolates the point in time when the electron beam passes over the surface of the CRT 24 in a region which is directed to a photodiode 350–352 and produces digital pulse 608 at those times. The pulse signal 608 is passed to a microprocessor 624, such as the Motorola 68HC11, for additional processing as discussed below.

The other portion of the split beam 601b is directed to the CCD 360. The CCD 360 is an array of silicon photosensitive cells that convert light intensity to electrical charge. In the preferred embodiment the CCD 360 consists of an array of 30 pixels by 30 pixels. The array can be as large as 2048 by 2048, though in this application such a large array is probably not necessary. Each pixel of the CCD 360 consists of three pixel color sensors. Each color sensor has a colored coating, typically chosen from the set red, green and blue, on the surface to filter out color frequencies. Therefore, each CCD pixel color sensor gathers light energy from one of three primary colors and generates a corresponding charge. The accumulated charge is proportional to the total amount of light incident on the surface of that cell.

The output of the CCD 360, an analog current, is converted to an analog voltage 361 and fed to a calibrated analog to digital (A/D) converter 380. During each 1/30 of a second, analog to digital (A/D) converter 380 converts the analog pixel signal value 361 from the CCD 360 to an 8-bit digital signal 622. A simple time-division multiplex scheme is used to cycle through the pixels. Since each pixel delivers three pieces of analog data to the converter 380 each 1/30 of a second, the converter 380 must be capable of converting 900 three color values every 1/30 second. This equates to 81,000 conversions per second or a little more than 12 microseconds per value. The output 622 of the A/D converter 380 is a series of 8-bit values. Thus, every 12 microseconds, the microprocessor 624 is presented with three (one for each color) such 8-bit values. The microprocessor 624 passes the data back to the host computer 24. This is accomplished by producing a serialized data stream 630 which is passed to a UHF/VHF encoder 632. Encoded data 633 is transmitted by way of the antenna 396 to the host processor 24. The radio link must be capable of supporting 81,000 24-bit samples every second. This equates to approximately 2 million bits per second. This data rate is reduced by including data compression in the encoder 632.

Through the use of built-in timing circuits, the microprocessor 624 generates suitable timing pulses for the CCD array over control lines 612 and performs a similar task of controlling the analog to digital converter using control lines 614. Typical timing functions include: start CCD charge collection; stop CCD charge collection; shift out CCD pixel values; and clear CCD.

Since any color image exhibits many properties of spatial correlation (i.e. many adjacent pixels have similar color values), the redundant information can be removed by processes known to those skilled in the art. The result can be a significant (e.g. 10:1) reduction in data bandwidth with little loss of actual image information. Such a bandwidth reduction would reduce the aforementioned 2 million bits per second to 200 kilobits per second. Furthermore, there is also a significant amount of temporal redundancy between samplings, since the brush head will generally be moved by only one or two CRT pixels every 1/30 second. Therefore an encoding of the difference between temporally adjacent CCD images provides another dramatic reduction in data bandwidth (e.g. 10:1). Combining these techniques, the resultant data rate from the encoder 632 may be as low as a few kilobits per second while still providing excellent image reconstruction quality.

The electronic brush 50 of the present invention uses a high accuracy quartz oscillator 640 to provide accurate timing for a clock circuit 638. A clock signal 628 is fed to the microprocessor 624, and a clock signal 620 is directed to the CCD 360 and the A/D converter 380.

A UHF/VHF decoder 636 is responsible for picking up transmitted timing information received by the antenna 396 from the host computer 24. An example might be the transmission of color data to the brush CCD 360 to calibrate the received colors with those displayed by the host CRT 24 to compensate for environmental factors such as room lighting.

As shown in FIG. 4 the hand-held palette 60 is oval and has dimensions of approximately 12 inches by 8 inches. The conveniently placed thumb hole 410 allows the artist to hold the palette for long periods without tiring. The electronic palette 60 is designed to function in a manner very similar to that of conventional paint palette. However, due to the nature of the electronic components, some additional features are provided.

In the use of a conventional palette, different colors of paint are squeezed out of tubes at various points on the palette and mixed at intermediate points. On the electric palette 60 are a number of oval color LCDs 431–438 with a length of about an inch. The LCDs 431–438 are under the command of a local microprocessor 708. The microprocessor 708 may be a Motorola 68HC11. Timing for the electronic palette 60 is achieved through the use of a high accuracy crystal oscillator 720. The oscillator 720 drives the clock 722 for the microprocessor 708. The microprocessor 708 issues commands to the color LCD swatches 431–438 over address bus 704 and data bus 702. The color set-up of the swatches 431–438 involves three color control rotary potentiometers 491–493.

A push button 451–458 is located next to each color swatch 431–438, respectively. The state of each button 451–458 is monitored by the microprocessor 708. As described above, a single push of a button 451–458 allows the color of the corresponding swatch 431–438 to be adjusted. A second push of the button 451–458 "locks in" the color. A double push clears the color in the color swatch 431–438. Depression of a palette clear button 734 allows all color swatches 431 and the mixing area 420 display to be cleared to white simultaneously. The palette clear button 734 is located on the bottom of the palette (not visible in FIG. 4) in a position for easy access, but is recessed so that it will not be accidentally pressed. A mixing area clear button 740 is also provided for clearing the display of the mixing area 420.

The mixing area 420 display of the palette 60 is generated by a small flat-panel CRT screen 420. The CRT 420 is driven by the local microprocessor 708. Interpretation of brush 50 actions over the palette CRT 420 is identical in theory and in practice as described above for the main computer CRT 20.

Like the electronic paintbrush 50, the electronic palette 60 communicates with the host computer 24 via a UHF/VHF short range radio link. Communications are achieved by an encoder 712 connected to the local microprocessor 708, and which sends encoded signals 711 to antenna 714 for transmissions. Communications are also received by the antenna 714, decoded by the decoder 716, and forwarded to the local microprocessor 708. Unlike the paintbrush 50, there is relatively little data to be transferred between the host computer 24 and the palette 60. However, there may be cases—where it is necessary for the palette to instruct the host on the state of paint mixing or for the host computer to actually run the software that determines the mixing of paint on the palette.

In an alternate embodiment of the present invention shown in FIG. 2, the palette is displayed in a palette window 210 on the CRT screen 20 adjacent the image window 230. Like a traditional palette, the electronic palette 210 provides a selection of a variety of color swatches 231–237 and an area for mixing 220 of the selected colors. The electronic paintbrush 50 is used to do the mixing and transferring of colors from the palette to the CRT 20. The ensuing detailed description will be in terms of the hand-held palette 60, and the adaptation of the features of the hand-held palette 60 to the CRT window palette 210 will be addressed below.

The low-cost embodiment of the present invention where the palette 210 is presented to the artist 55 on the same CRT 20 as the picture image 230 is shown in FIG. 2. The artist 55 uses the electronic paintbrush 50 to select colors from swatches 231–237 and mix them in a mixing area 220 within the palette window 210. Once mixed, the brush 50 may be placed onto the image window 230 displayed on the same CRT 20 that contains the palette 210. The painting in the image window 230 may be worked on until new colors are needed at which point the artist 55 then returns the brush 50 to the palette window 210 and makes a color selection by touching the brush 50 to the CRT screen in the same manner in which he would utilize a separate physical palette.

The artist 55 may select from a primary color swatch 231–237 the color red and then place it into the palette mixing area 220. The selected color is "remembered" by the brush 50 and placed into the mixing area 220. Then the artist 55 may select from a different color swatch 231–237 the color green by touching the fibers of the brush against the color swatch 231–237. When the brush 50 is then touched to the mixing area 220 and moved in, for instance, an up and down motion, the two colors (red and green) previously placed in the mixing area 220 appear to become mixed. Once the desired blend of colors is achieved, the brush 50 is placed against the CRT screen 20 and the blended colors from the mixing area 220 are transferred to the region of contact on the CRT screen 20 and have the appearance of colors actually painted on the screen 20. The artist 55 does not need to wash the brush 50 of the present invention. A double press on the handle button 370 resets any color information previously stored by the brush 50.

In the low-cost embodiment shown in FIG. 2, the color setting and clearing functions of the buttons on the palette of the first embodiment may be performed by input through the keyboard 26. The corresponding adaptation of the circuitry of FIG. 7 to circuitry internal to the host processor 24 will be apparent to those skilled in the art.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many other variations are possible. For instance, the electronic brush may be of any size; the brush head may have other shapes; the brush head may have any number of optic fibers; the optic fibers may have any diameter, may be made of any material, and may have any length; other means may be used for removably attaching the brush head to the handle; the brush head need not be removable; the raw data from the CCD may be sent directly to the host processor; the optical sensing device may utilize more photodiodes; the swatches on the palettes may have colors other than those specified; the palette circuitry may include special mixing effects which would control how the paint flows together within the mix area and might allow swirling, complete mixing, speckling, airbrushing, etc.; the palette may include means for saving all colors on the palette in the event of a power shut down; the palette and/or display screen may include brightness and contrast controls; the palette swatches may be lit by three colored lights rather than an LCD; communication between the brush, palette and host processor may be by other means, including ultrasonic radiation or electric cables interconnecting the elements; the sampling time for the CCD may be 1/60 of a second or any other workable period; the brush circuitry may include one A/D converter for each primary color; the CCD array may have any shape; the hand-held palette may be of any shape and size; or the system may include battery chargers which are adapted so that the brush and palette may be seated in the chargers when not in use. Accordingly, it is intended that the scope of the invention be defined by the claims appended hereto and their equivalents.

What is claimed is:

1. An apparatus with which a user manipulates an initial image displayed on an electronic image-display screen to generate a modified image, comprising:
   (a) an elongated handle, said handle having a brush end, a back end, and a longitudinal axis extending through said brush end and said back end;
   (b) a first brush head attached at said brush end of said handle;
   (c) a number of flexible optic fiber bristles protruding therefrom in a direction away from said handle, said optic fiber bristles having a handle end proximal said handle and a working end opposite said handle end, said optic fiber bristles channeling light from said working end to said handle end;
   (d) a plurality of transforming means for transforming said channeled light to electrical signals, said transforming means being located near said handle end of said optic fiber bristles; and
   (e) means for processing said electrical signals, said processing means including location determining means for determining a location of said optic fiber bristles on said screen when said bristles are in contact with a contact area of said screen, and angular orientation determining means for determining an angular orientation of said handle about said longitudinal axis when said optic fiber bristles are in contact with said contact area.

2. The apparatus of claim 1 wherein said processing means further includes tilt measuring means for measuring a tilt angle between said longitudinal axis and a normal vector to the image-display screen.

3. The apparatus of claim 2 wherein said tilt measuring means includes an intensity determining means for determining the intensity of said channeled light.

4. The apparatus of claim 3 wherein one of said transformation means includes a charge-coupled device.

5. The apparatus of claim 1 further including a means for determining the color of said channeled light.

6. The apparatus of claim 5 wherein said transforming means comprises a charge-coupled device.

7. The apparatus of claim 6 further including three arrays of color filters located adjacent said charge-coupled device.

8. The apparatus of claim 1 wherein the brightness of regions of the initial image vary in time, said location determining means using the brightness variations at a region within said contact area to determine said location of said optic fiber bristles, said angular orientation determining means using the brightness variations at two regions within said contact area to determine said angular orientation.

9. The apparatus of claim 8 wherein said processing means further includes a pressure determining means for determining a pressure with which said optic fiber bristles are pressed against the screen by measuring a change in intensity of said channeled light corresponding to bending of said optic fiber bristles.

10. The apparatus of claim 9 wherein said pressure determining means uses said brightness variations at two regions within said contact area to determine said pressure.

11. The apparatus of claim 9 wherein said pressure determining means uses said brightness variations at three regions within said contact area to determine said pressure.

12. The apparatus of claim 11 wherein said pressure determining means measures time delays between brightness variations within said contact area, an increase in said time delays correlating with an increase in said pressure.

13. The apparatus of claim 11 wherein said three regions are located at the corners of an asymmetrical triangle.

14. The apparatus of claim 9 wherein said screen emits light and said pressure determining means comprises a means for comparing the intensity of said emitted light within said contact area with the intensity of said channeled light.

15. The apparatus of claim 1 further including a second brush head, said second brush head having a plurality of optic fiber bristles for channeling light from a working end to a handle end of said optic fiber bristles, and an attachment mechanism for removably securing the handle end of one of said brush heads to said handle.

16. The apparatus of claim 15 wherein said attachment mechanism includes a means for determining which of said brush heads is attached to said handle.

17. The apparatus of claim 1 further comprising optical means for focusing said channeled light onto said plurality of transforming means.

18. The apparatus of claim 1 further including a host processor interfaced to said image-display screen, and wireless means for communication of information between said handle and said host computer.

19. The apparatus of claim 18 further including a means for data compression of said information.

20. The apparatus of claim 1 further comprising a palette having a plurality of swatches of color, means for assigning the color of a particular swatch to a group of said optic fiber bristles when said group of said optic fiber bristles are in contact with said particular swatch, and means for transferring said assigned color to the image when said group of said optic fiber bristles is in contact with said contact area of the screen to produce a resultant image.

21. The apparatus of claim 20 further including a switch on said handle for user control of the activation of said transferring means and said assigning means.

22. The apparatus of claim 21 further including a means for clearing said assigned colors from said group of said optic fiber bristles.

23. The apparatus of claim 20 wherein said transferring means includes a means for mixing ,colors so that the color of said resultant image within said contact area is a combination of said assigned colors and the colors of said initial image within said contact area.

24. The apparatus of claim 23 wherein said means for mixing includes a means for adjusting the contribution of said assigned colors to said resultant color.

25. The apparatus of claim 20 wherein said palette is displayed on said image-display screen.

26. The apparatus of claim 20 wherein said palette is displaceable from said image-display screen.

27. The apparatus of claim 26 wherein said palette includes a thumb hole for easy gripping.

28. The apparatus of claim 20 further comprising a memory means for storing said palette colors.

29. The apparatus of claim 28 wherein said memory means is comprised of non-volatile memory chips, whereby said palette colors are stored in the event of a power failure.

30. The apparatus of claim 20 further including a means for clearing said palette colors.

31. The apparatus of claim 20 further including adjusting means for adjusting said palette colors.

32. The apparatus of claim 31 wherein said adjusting means includes hue control means for controlling the hue of said palette colors and intensity control means for controlling the intensity of said palette colors.

33. The apparatus of claim 1 further including a battery stored in said handle.

34. The apparatus of claim 20 further including means for selection of said palette colors.

35. The apparatus of claim 1 wherein said first brush head includes a first brush head mount and said handle includes a handle mount, said first brush head mount being removably engageable with said handle mount.

36. The apparatus of claim 35 further including a second brush head having a number of flexible optic fiber bristles protruding therefrom for channeling light from a working end to a handle end of said bristles, said handle end of said optic fiber bristles being adjacent said handle, said working end of said optic fiber bristles being opposite said handle end, and said second brush head including a second brush head mount being removably engageable with said handle mount.

37. The apparatus of claim 1 wherein each of said optic fiber bristles has a cross-sectional area, and a product of said cross-sectional area and said number of optic fiber bristles is much greater than an area of a pixel on said screen.

38. An apparatus with which a user manipulates an initial image displayed on an electronic image-display screen having a normal vector to generate a modified image, said apparatus comprising:
 (a) an elongated handle, said handle having a brush end, a grip end, and a longitudinal axis;
 (b) a brush head located at said brush end of said handle, said brush head having a number of optic fiber bristles for channeling light from a working end to a handle end of said optic fiber bristles, said handle end of said optic fiber bristles being adjacent said handle and said working end of said optic fiber bristles being opposite said handle end;
 (c) a first plurality of transforming means for transforming time variations in brightness of said channeled light through said optic fiber bristles to first electrical signals, said transforming means being located near said handle end of said Optic fiber bristles;
 (d) first means for processing said first electrical signals, said first processing means including location determining means for determining a location of said optic fiber bristles on said screen when said optic fiber bristles are in contact with a contact area of said screen, said location determining means using said time variations in brightness at a region within said contact area to determine said location, said location determining means including means for determining an angular orientation of said handle about said longitudinal axis when said optic fiber bristles are in contact with said contact area, said angular orientation determining means using said time variations in brightness at two regions within said contact area to determine said angular orientation;
 (e) a second plurality of transforming means for transforming said channeled light to second electrical signals, said transforming means being located near said handle end of said optic fiber bristles; and
 (f) second means for processing said second electrical signals, said second processing means including means for determining a tilt angle of said longitudinal axis of said handle with said normal vector, said initial image having a first intensity at said contact area at a given time, said second processing means comparing a second intensity of said channeled light at said given time and said intensity of said initial image at said contact area at said given time in order to determine said tilt angle.

39. The apparatus of claim 38 wherein said first plurality of transforming means comprises photodiodes and said second plurality of transforming means comprises charge-coupled devices.

40. The apparatus of claim 35 wherein said optic fiber bristles are flexible and protrude from said brush head.

41. The apparatus of claim 40 wherein each of said optic fiber bristles has a cross-sectional area, and a product of said cross-sectional area and said number of optic fiber bristles is much greater than an area of a pixel on said screen.

* * * * *